United States Patent [19]

Dettmer et al.

[11] 4,021,176

[45] May 3, 1977

[54] CUTTING APPARATUS

[75] Inventors: Edward V. Dettmer, Bay City; Earl T. Heckeroth, Midland, both of Mich.

[73] Assignee: The Dow Chemical Company, Midland, Mich.

[22] Filed: Oct. 3, 1975

[21] Appl. No.: 619,350

[52] U.S. Cl. .............................. 425/313; 425/307; 264/141; 264/142

[51] Int. Cl.² ....................................... B29C 17/14

[58] Field of Search ............. 425/8, 382, 464, 142, 425/313, 307, 308, 311, 313; 264/8, 140, 141, 142, 143, 144; 65/8, 14, 15

[56] References Cited

UNITED STATES PATENTS

| | | | |
|---|---|---|---|
| 2,783,809 | 3/1957 | Haines | 403/47 |
| 3,832,114 | 8/1974 | Yoshida | 425/313 |
| 3,912,434 | 10/1975 | Nagahara et al. | 425/142 |

FOREIGN PATENTS OR APPLICATIONS

| | | | |
|---|---|---|---|
| 1,449,787 | 6/1965 | France | 425/313 |

*Primary Examiner*—Robert L. Spicer, Jr.
*Attorney, Agent, or Firm*—Robert B. Ingraham

[57] ABSTRACT

An improved cutter for hot plastic strands is provided which uses an annular die plate having a plurality of strand-extruding openings, the openings being generally coplanar. A rotating cutter is provided adjacent the die plate with cutting knives resiliently tensioned toward the face of the die, the cutter being adjustably mounted relative to the die in a manner to provide highly accurate adjustment and to minimize thermal movement of the die relative to the cutter.

6 Claims, 9 Drawing Figures

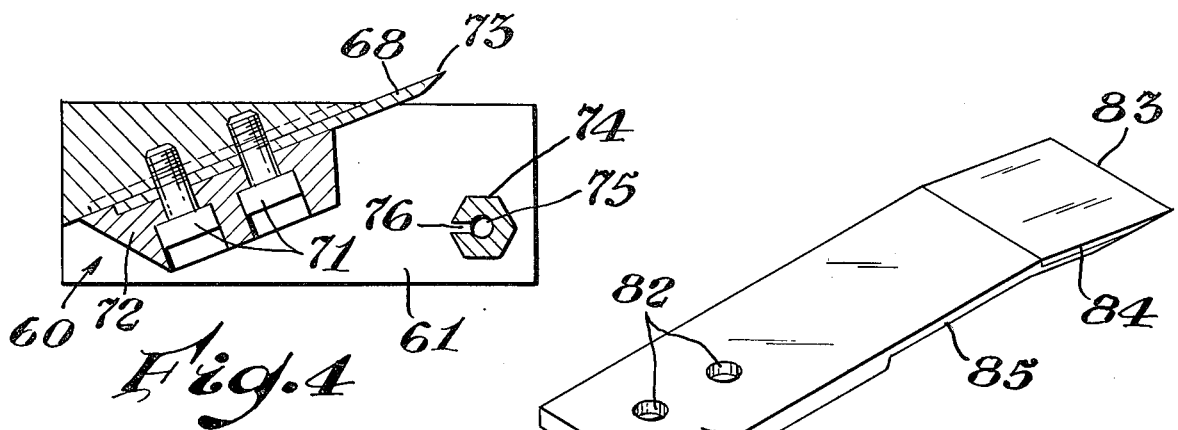
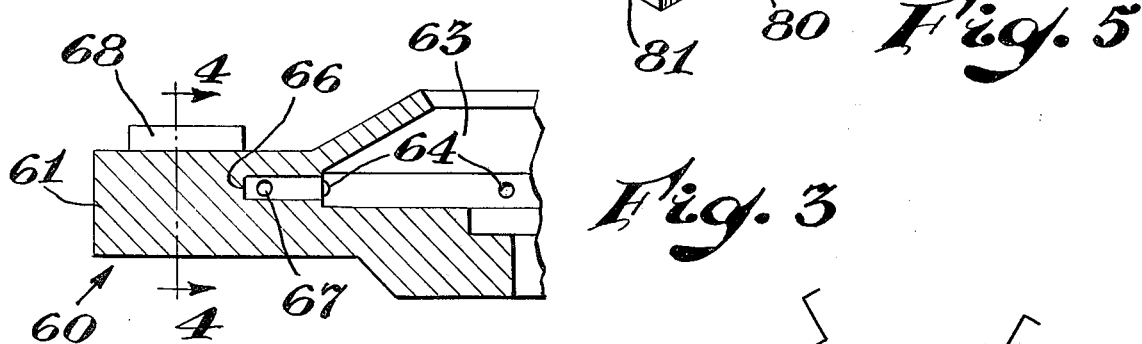
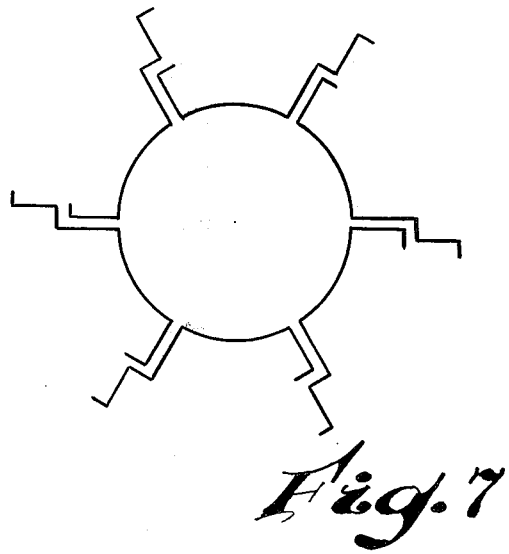
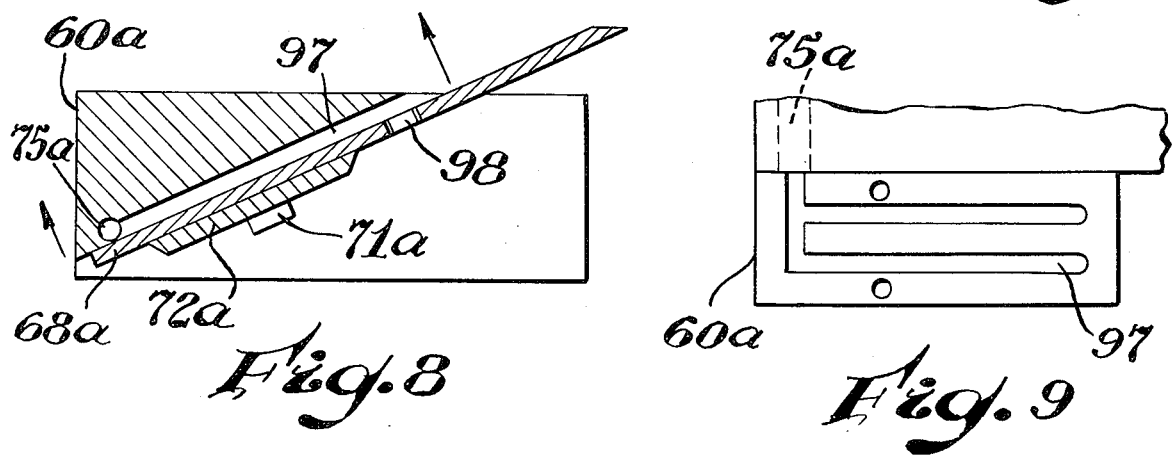

CUTTING APPARATUS

Many plastic materials are normally provided to the processor in the form of granules. In many instances, such granules are formed by the extrusion of a plurality of strands and the strands subsequently cut or broken into a plurality of lengths. Oftentimes, the length of the granules being from about ½ to 3 times the strand diameter.

Many machines have been provided to accomplish the severing of the plastic strands. In some methods, the strands are extruded, cooled, passed to a rotary impact mill or grinder or the appropriate length of strand to form the granules is fractured from the major length. Some granule-producing apparatus employ knives or cutters disposed adjacent the die plate from which the strands are being extruded and the extruded strand is severed into granules without substantial cooling prior to cutting. Such devices are often referred to as die face cutters. Some such die face cutters operate in air with or without water spray for cooling. Other die face cutters operate immersed in water or other coolant liquid. Some die face cutters employ circular knives which rotate about and on the axis as well as about the axis of the die. Such cutters have been referred to as epicyclic die face cutters. Another mode of preparing granules is to employ a centrifugal extruder wherein centrifugally extruded strands are severed by means of a knife disposed adjacent a rapid rotating centrifugal die. Other plastic granule preparing apparatus have made use of extrusion in a generally radially inwardly direction and severing the strands by a knife rotating within a cylindrical inwardly extruding strand die. Others have made use of a generally cylindrical outwardly extruding die. Frustoconical inwardly extruding dies have also been employed. In a die face cutter, substantial difficulty is often encountered in maintaining the desired clearance between the die face and the cutter blade. With at least some thermoplastic polymers, cutter blades dull rapidly and in some instances, whether the blades be dull or sharp, the cutters succeed in smearing the heat plastified polymer over the die face, a situation that frequently gives rise to particles which are nonuniform and of an undesired shape. Many die face cutters are mechanically complex, employ blades which are relatively difficult and expensive to maintain and are designed in such a way that variations in temperature cause a substantial and significant variation in the spacing of the blade from the face of the die from which the strands are being extruded.

It would be desirable if there were available an improved apparatus for the severing of extruded polymer strands into granules.

It would also be desirable if there were available an improved apparatus for the preparation of synthetic resinous granules which would permit ready adjustment of the clearance between the cutter and the die face.

It would also be desirable if there were available an improved die face cutter for the preparation of synthetic resinous granules wherein one had the option of operating at a predetermined clearance or generally without clearance between the die face and the cutter.

It would also be desirable if there were available an improved die face cutter for the preparation of synthetic resinous thermoplastic granules which would permit a blade to run against the die face at a predetermined pressure when the die face deviated slightly from a planar form.

These benefits and other advantages in accordance with the present invention are achieved in an apparatus for the preparation of granules from a plurality of extruded heat plastified synthetic resinous thermoplastic strands, the apparatus comprising in cooperative combination a die, the die comprising a generally annular die body, the die body defining a generally annular plenum, the plenum having means to communicate with a source of heat-plastified synthetic resinous material, a die plate affixed to and supported by the die body, the die plate having a generally annular configuration and defining a plurality of extrusion openings capable of extruding a heat plastified synthetic resinous strand, the extrusion openings teminating on a die face remote from the means to communicate with the source of heat-plastified thermoplastic material, the die face having an annular planar configuration, the die body defining an opening generally coaxially disposed with the die face, the die body having affixed thereto a hollow mandrel coaxial with the axis of the opening, a rotor rotatably and slidably supported on the mandrel, the rotor being rotatable about the axis of the opening, means to position the rotor along the axis of the opening, the rotor being positionable without apparent backlash, at least two cutting elements disposed on and supported by the rotor, the cutting elements being adjacent the face of the annular die, the cutting elements having cutting edges which are resiliently supported relative to the rotor and capable of flexing toward or away from the die face, means to rotate the rotor relative to the die face.

Further features and advantages of the present invention will become more apparent from the following specification taken in connection with the drawing wherein:

In FIG. 1 there is depicted a schematic, partly-in-section view of a cutter in accordance with the present invention;

FIG. 3 is a fractional sectional view of the rotor of the apparatus of FIG. 1;

FIG. 4 is a sectional view of an arm of the rotor of the apparatus of FIG. 1;

FIGS. 5 and 6 are schematic representations of cutters suitable for use with the apparatus of FIG. 1;

FIG. 7 is a schematic representation of the cooling fluid distribution suitable for use with a rotor of the apparatus in accordance with the present invention; and FIGS. 8 and 9 are two schematic representations of cutter blade mountings for the apparatus of the present invention.

Figure 1:
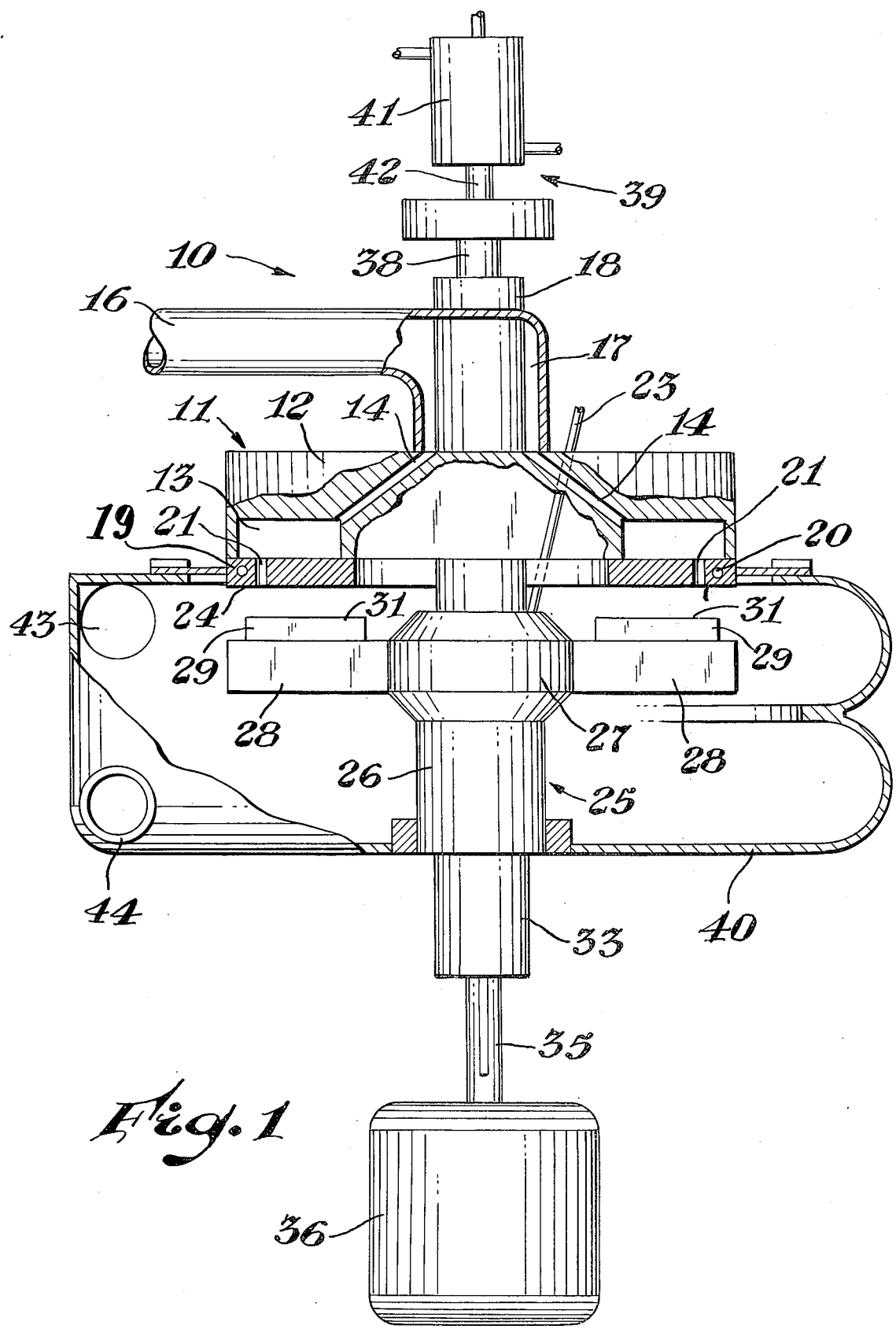

In FIG. 1 there is schematically depicted a partly-in-section view of an apparatus in accordance with the present invention generally designated by the reference numeral 10. The apparatus 10 comprises in cooperative combination a generally annular extrusion die 11. The extrusion die 11 comprises a die body 12, the die body has a generally annular discoidal configuration, the die body 12 defines an annular plenum 13, a plurality of heat-plastified synthetic resinous supply passages 14 communicate with the plenum 13 and extend radially and axially inwardly to a location remote from and central to the annular plenum 13. The passageways 14 are in full communication with a source 16 of heat-plastified synthetic resinous thermoplastic material which is to be formed into granules. A terminal portion 17 of the source 16 adjacent the passages 14 has a generally annular configuration. The die body 12 defines a mandrel 18 extending through the annular portion of the die body defining the plenum 13. The mandrel 18 is hollow and defines a generally cylindrical passage generally coaxial with the plenum 13. A die plate 19 is affixed to the die body 12. The die plate 19 defines an internal generally annular liquid passage 20, a plurality of extrusion orifices 21. The passage 20 beneficially may be employed to heat the die plate 19 or on shut down of the unit a cooling liquid may be used to solidify the plastic material in the orifices 21 and thereby prevent so-called "die drool". The extrusion orifices 21 extend in a direction generally parallel to the axis of the mandrel 18 and parallel to the axis of generation of the plenum 13. The plurality of openings 21, two shown, lie in a generally annular configuration whose axis is coaxial with the mandrel 18. A conduit or cooling fluid supply means 23 extends from a location generally adjacent the end or terminal position 17 of the conduit 16 to a location generally within the annular die plate 19. The annular die plate 19 has a die face 24. Generally adjacent the die plate 19 is a rotating cutter assembly 25. The cutter assembly 25 comprises a bearing and adjustment housing 26, a cutter hub 27 and cutter arms 28 supporting cutters 29. The cutters 29 have cutting edges 31 which, as depicted in FIG. 1, are generally parallel to and spaced from die face 24. The housing 26 remote from the die face 24 defines a drive receiving socket or coupling 33 which is in cooperative combination with a drive shaft 35 which in turn is supported and driven by a motor 36. The shaft 35 is axially slidable within the socket 33 permitting relative motion of the rotor 25 and the motor 36 along the axis of the mandrel 18. The cutter hub 27 defines an internal cavity, not shown, into which the conduit 23 can introduce cooling fluid. An adjustment means 38 having a hollow shaft 38' extends axially within the mandrel 18 and engages support for the cutter assembly 25 permitting axial adjustment of the rotating cutter assembly 25 relative to the die face 24. An anti-backlash assembly or means 39 is disposed adjacent the adjustment means 38 as depicted in FIG. 1 and prevents undesired axial movement of cutter assembly 25. The anti-backlash means comprises a hydraulic cylinder 41 affixed to a shaft 42 which in turn extends axially through the mandrel 18 and engages a rotor support assembly not shown. The anti-backlash assembly may employ spring pressure, air pressure and the like. However, a hydraulic cylinder is particularly advantageous as it provides a convenient means to position the cutter assembly during servicing. Beneficially, a housing 40 is disposed about the die plate 19 and rotor 25 to receive and restrain pellets with cooling fluids such as air or water. Beneficially, the housing 40 is provided with an air inlet such as the inlet 43 which introduces air tangentially and concurrently and optionally countercurrent to the rotation of the rotor. Beneficially, air and/or cooling liquids such as water and pellets are discharged also tangentially through conduit 44 whose axis lies in a plane containing the axis of conduit 43, conduit 43 being generally adjacent the die plate 19 and conduit 44 being remote from the die plate 19.

Figure 2:
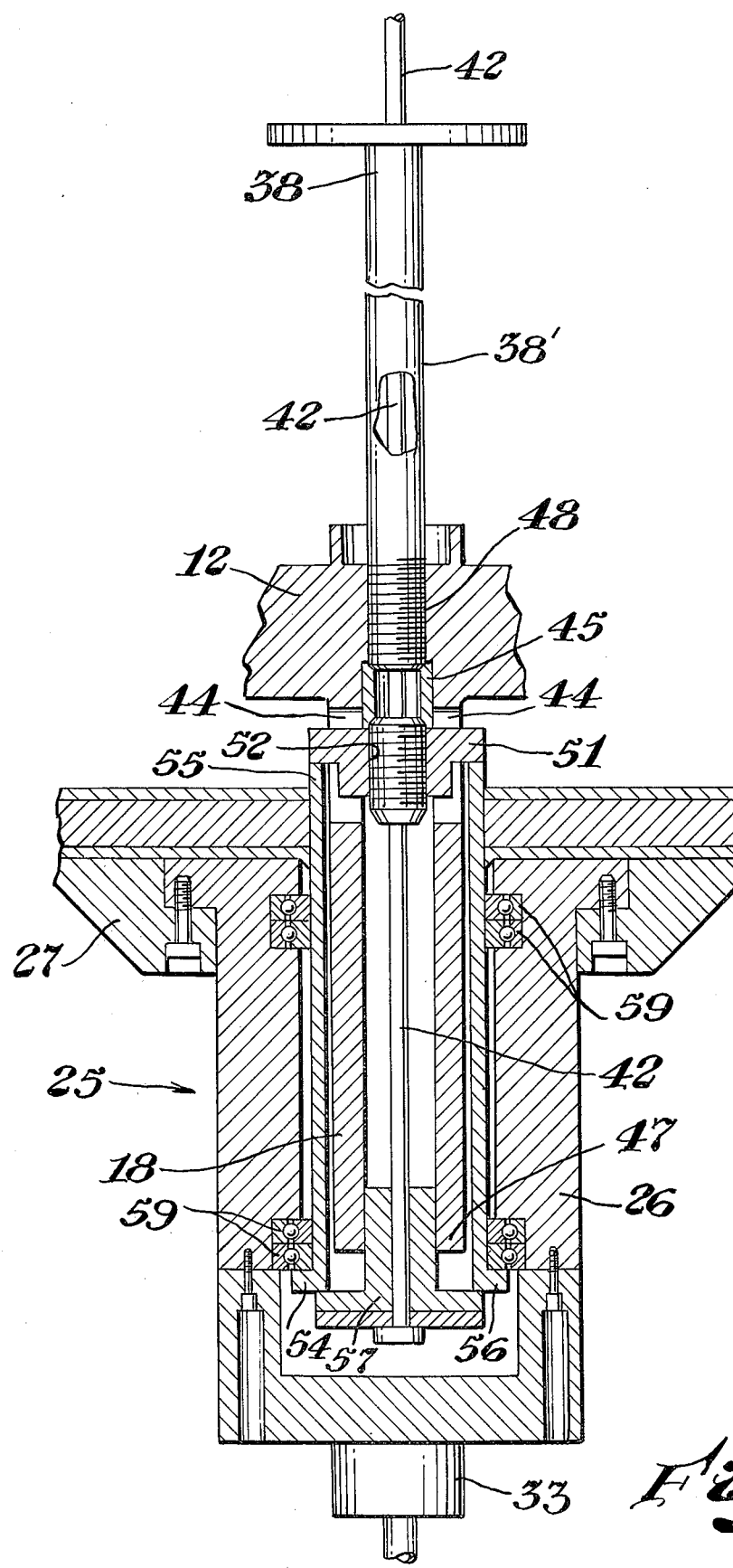
FIG. 2 is a fractional sectional view of the rotor mounting of the apparatus of FIG. 1.

In FIG. 2 there is schematically represented a fractional sectional view of a portion of the apparatus 10 of FIG. 1 which supports and adjusts the rotor 25. The mandrel 18 extends axially from the die body 12 and defines a plurality of axially extending slots 44 which communicate with a passageway 45 defined within the mandrel, the passageway being coaxial with the mandrel and the die plate 19. The mandrel 18 has an end 47 remote from the hydraulic cylinder 41 and generally adjacent the die plate 19. The shaft 42 extends entirely through the mandrel 18 and terminates at a location adjacent the end 47 and external to the mandrel 18. The shaft 38' threadably engages the die body 12 at a location 48. On rotation of the adjustment means 38, the adjustment means is moved into or out of the die body 12 by the action of mating screw threads defined by the adjustment means 38 and the die body 12. A positioning means or lug nut 51 engages screw threads on the adjustment means 38 at a location 52. Portions of the lug nut 52 project outwardly through the slots 44 of the mandrel 18. The screw threads at locations 48 and 52 are of different pitch and provide a differential screw action which permits very precise adjustment of the position of the lug nut 51 relative to the body 12. Beneficially, the differential screw is positioned generally in the plane of the die plate and cutters thereby minimizing axial change of location of die plate and rotor with temperature change. A guill 54 of generally hollow cylindrical configuration is disposed over the mandrel 18. The quill 54 has a first end 55 which engages the lug nut 51 and a second end 56 remote from the lug nut 51 and generally adjacent the end 47 of the mandrel 18. The shaft 42 carries a flanged bushing 57 which slides within the mandrel 18 and engages the terminal portion 56 of the quill 54. The hydraulic cylinder 41 of FIG. 1 urges shaft 42 in an axial direction such that the quill 54 is compressed between the flanges bushing 57 and the lug nut 51, thereby providing an anti-backlash device to prevent undesired axial motion of the quill 54. The adjustment means 38 is free to rotate about the shaft 42 and thus the adjustment means 38 can be rotated without rotation of the shaft 42. A plurality of bearings 59 are disposed on the quill 54 and also engage the hub 26 permitting free rotation of the hub 26 of the quill 54.

In FIG. 3 there is depicted a fractional sectional view of a rotor portion 60 such as the hub and arms 28 of FIG. 1. The rotor portion 60 has a body 61 which defines a generally annular outwardly tapering groove 63 (supplied by conduit 23 of FIG. 1) having cooling fluid ports 64 which extend generally radially outwardly and terminate at a location 66 remote from the groove 63. The ports 63 communicate with a lateral passageway 67 at a location generally adjacent a cutter blade 68.

FIG. 4 depicts a partly-in-section end view of the rotor portion 60 of FIG. 3 taken along the line 4—4 of FIG. 3. The blade 68 is affixed to the body 61 by means of cap screws 71 and clamp block 72. A fluid cooling dispenser or nozzle 74 is affixed to the body 61 generally adjacent the blade 68. The nozzle 74 has a generally axially extending passageway 75 which is in full communication with passage-way 67. The nozzle 74 defines a generally elongate passage-way 76 which is in full communication with the passageway 75. Thus, liquid entering the groove 63 of FIG. 3 is thrown outwardly by centrifugal force through the ports 64 into the passage 75 and out through the slot-like passage 76 toward the blade 68.

FIG. 5 depicts an alternate embodiment of a cutter blade 80 suitable for use in the present invention. The blade 80 comprises a blade body 81 defining first and second mounting openings 82, a cutting edge 83, beneficially provided with a hard surfaced region 84. Between the hard surfaced region 84 and the portion of the body containing the mounting holes 82 is a region of reduced thickness 85. The region of reduced thickness 85 permits increased movement of the cutting edge 83 relative to the portion of the body 81 remote from the cutting edge when pressure is applied causing the blade to flex.

In FIG. 6 there is depicted an alternate blade 90 for use in practice of the present invention. The blade 90 is of relatively constant thickness and has a hard surfaced cutting edge 91 and a generally centrally disposed mounting region 92 defining mounting holes 93. A generally U-shaped slot 94 partially surrounds mounting portion 92. The base of the U-shaped slot is disposed generally adjacent the the cutting edge 91 and the legs of the slot extend away from the cutting edge 91. A blade of the configuration set forth in FIG. 6 is employed where maximum flexibility is desired while retaining a sufficient mass to prevent undesired oscillation.

In FIG. 7 there is schematically depicted a coolant flow pattern designated by the reference numeral 95. Pattern 95 schematically represents the confining surfaces encountered by a liquid upon entering a six-armed rotor employing surfaces and nozzles such as are set forth in FIG. 3 and 4.

In FIG. 8 there is schematically depicted a sectional view of one arm or rotor in accordance with the present invention generally designated by the reference numeral 60a. The arm 60a defines a cooling fluid or water supply passageway 75a disposed adjacent a blade 68a. The arm 60a receives the blade 68a in such a manner that it is clamped in angular relationship to the axis of rotation of the arm 60a. The blade 68a is clamped in position by means of the clamp member 72a and two retaining or clamping bolts 71a, only one shown. The arm 60a defines a generally U-shaped recess 97 in communication with the supply passageway 75a. The supply passageway 75a is in communication with the base of the U. The blade 68a remote from the passageway 75a defines a pair of spaced-apart passageways 98, only one shown, which are located in such a manner as to be coincidental with the ends of the legs of the U-shaped passage 97.

Employing the embodiment as depicted in FIGS. 8 and 9, maximum use is made of a cooling fluid such as water entering the passage 75a. The fluid enters into the base of the U, passes toward the cutting edge of the blade 68a and is discharged through the two passageways 98 thereby providing maximum cooling to the blade 68a and discharge the cooling fluid onto pellets severed from the strand die not shown. Employing an apparatus in accordane with the present invention, extrudable synthetic resinous materials are readily pelletized.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus for the preparation of granules from a plurality of extruded heat-plastified synthetic resinous thermoplastic strands, the apparatus comprising in cooperative combination a die, the die comprising a generally annular die body, the die body defining a generally annular plenum, the plenum having means to communicate with a source of heat-plastified synthetic resinous material, a die plate affixed to and supported by the die body, the die plate having a generally annular configuration and defining a plurality of extrusion openings capable of extruding a heat-plastified synthetic resinous strand, the extrusion openings terminating on a die face remote from the means to communicate with the source of heat-plastified thermoplastic material, the die face having an annular planar configuration, the die body defining an opening generally coaxially disposed with the die face, the die body having affixed thereto a hollow mandrel coaxial with the axis of the opening, a rotor rotatably and slidably supported on the mandrel, the rotor being rotatable about the axis of the opening means to position the rotor along the axis of the opening, the rotor being positionable without apparent backlash, at least two cutting elements disposed on and supported by the rotor, the cutting elements being adjacent the face of the annular die, the cutting elements having cutting edges which are resiliently supported relative to the rotor and capable of flexing toward or away from the die face, means to rotate the rotor relative to the die face, the rotor defining at least two passageways extending generally radially outwardly, the passageways terminating generally adjacent said cutting elements so that liquid is thrown outwardly by centrifugal force toward the cutting elements, and means to supply a cooling liquid to said generally radially outwardly extending passages.

2. The apparatus of claim 1 wherein the means to position the rotor is a differential screw assembly.

3. The apparatus of claim 2 including a tension means to preload the differential screw.

4. The apparatus of claim 3 wherein the tension means is a hydraulic cylinder.

5. The apparatus of claim 2 wherein the differential screw assembly is located generally in the plane of the die plate.

6. The apparatus of claim 1 including a housing disposed about the rotor adapted to receive granules prepared thereby.

* * * * *